United States Patent [19]

Kuwabara et al.

[11] Patent Number: 4,918,278
[45] Date of Patent: Apr. 17, 1990

[54] JOINABLE ARC GOUGING ELECTRODES WITH INDICATOR FOR INDICATING, DURING USE, WHEN ARC IS A PREDETERMINED DISTANCE FROM END OF ELECTRODE; AND METHOD OF USING SAME

[75] Inventors: Naruo Kuwabara, Gifu; Toshio Kozima, Oogaki; Takayuki Mizutani, Gifu, all of Japan

[73] Assignees: Ibiden Co., Ltd.; Ibiden Kosan Co., Ltd., Gifu, Japan

[21] Appl. No.: 42,958

[22] Filed: Apr. 27, 1987

[30] Foreign Application Priority Data

Apr. 30, 1986 [JP] Japan ................... 61-101662

[51] Int. Cl.⁴ ................... B23K 9/24; B23K 35/04
[52] U.S. Cl. ................... 219/69.1; 219/70
[58] Field of Search ................... 219/69 R, 70, 145.1, 219/145.21, 69.1

[56] References Cited

U.S. PATENT DOCUMENTS

| | | | |
|---|---|---|---|
| 1,582,081 | 4/1926 | Peck | 219/145.21 |
| 2,024,445 | 12/1935 | Galehouse | 219/145.1 |
| 2,034,259 | 3/1936 | Hopkins | 219/145.1 |
| 2,914,654 | 11/1959 | Lundahl et al. | 219/145.1 |
| 3,030,544 | 4/1962 | Zamboldi et al. | 219/70 |
| 3,399,322 | 8/1968 | Ambe | 219/145.21 |
| 3,633,063 | 1/1972 | Ando | 219/145.21 |
| 4,201,902 | 5/1980 | Rieppel et al. | 219/68 |
| 4,395,617 | 7/1983 | Maeda et al. | 219/145.1 |
| 4,492,850 | 1/1985 | Yasuda et al. | 219/145.1 |
| 4,555,615 | 11/1985 | Yasuda et al. | 219/145.1 |

*Primary Examiner*—M. H. Paschall
*Assistant Examiner*—Geoffrey S. Evans
*Attorney, Agent, or Firm*—Sherman and Shalloway

[57] ABSTRACT

Method and Apparatus for using successively joined carbon electrodes (that are not coated with a metal) shaped with a projection at one end and a socket at the other end. In order for the user to know the existing length of the electrode performing the gouging this electrode is marked with a notch, ink or material which changes its color at elevated temperatures at 80 mm, 60 mm, and 40 mm.

10 Claims, 1 Drawing Sheet

JOINABLE ARC GOUGING ELECTRODES WITH INDICATOR FOR INDICATING, DURING USE, WHEN ARC IS A PREDETERMINED DISTANCE FROM END OF ELECTRODE; AND METHOD OF USING SAME

FIELD OF THE INVENTION

This invention relates to a method of using joinable gouging carbon electrodes. More particularly, this invention relates to a method of using joinable gouging carbon electrodes of which projecting and socket portions in the joint are not coated with any metal so that there forms carbon-to-carbon contact.

PRIOR ART

A number of proposals, including Japanese Utility Model Registration Publication No. 47-32059, have so far been open to the public in regard to various joinable gouging carbon electrodes of diameter about 6.5 to 25.4 mm. Structurally speaking, however, they are in general devised to form coupling with projecting and socket portions so that a stub of carbon electrode in use can be pieced out with a new one when burning off to about 150-170 mm. Therefore, their joint is usually coated with metal, such as copper, lest a carbon electrode on top should come off from the other on bottom during gouging operation. On account of that, the joint part, i.e. both projecting and socket portions of a conventional joinable carbon electrode have to be machined very accurately and good care has to be taken of giving a layer of metal with exact thickness so that both the portions can well fit with each other. Owing to such difficulties in their processing, their yield is usually low, especially in the production of gouging carbon electrodes of diameter less than 9.5 mm. Nevertheless, the projecting portion and the brim of the socket portion are so fragile that they very often break on their fitting and cannot bear practical use.

SUMMARY OF THE INVENTION

Under the circumstances, the present inventors made an intensive study to eliminate conventional drawbacks and finally found a method of successively using joinable gouging carbon electrodes, getting to know that when neither the projecting portion nor the socket portion in their joint is coated with metal so that there forms carbon-to-carbon contact and a carbon electrode atop the other is used at a length of 80 mm or less, nearly a half of the length where a conventional gouging carbon electrode has to be pieced out, the joint can be prevented from disengagement similarly to those coated with metal because of the oxidation taking place in the joint by local heat generation, which prevents their disengagement until the carbon electrode on top is exhausted to an allowable limit.

It is an object of this invention to provide joinable gouging carbon electrodes of which engagement can be made easily with little resistance and of which disengagement during operation is prevented in the surest manner. And the object of this invention can be accomplished by what the present inventors claim as to this invention.

This invention will be explained below in more detail in reference with the accompanying drawings.

DETAILED DESCRIPTION OF THE INVENTION

Figure 1:
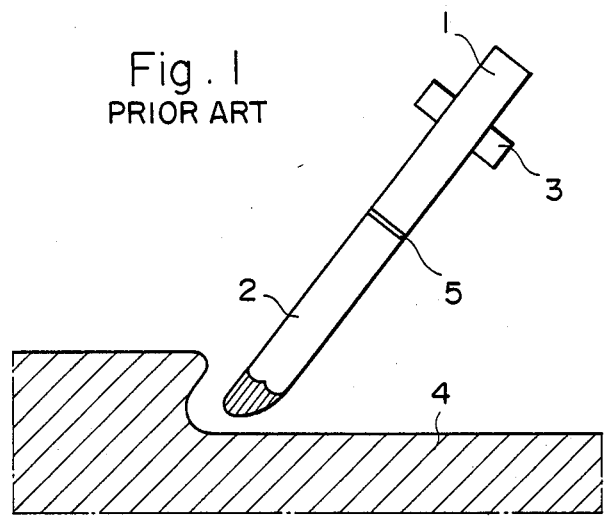
FIG. 1 is an illustration showing a longer gouging carbon electrode attached to the top of the other in a conventional gouging process.
Figure 2:
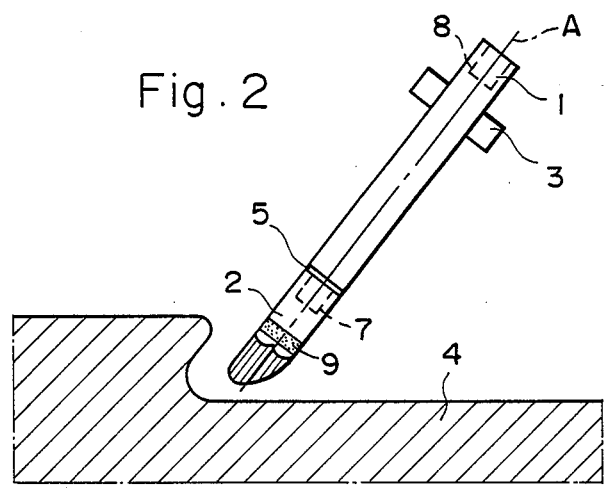
FIG. 2 is an illustration showing a shorter gouging carbon electrodes attached to the top of the other in an embodiment of this invention.

In FIGS. 1 and 2, two pieces of gouging carbon electrodes 1, 2 are jointed together at a joint 5 with their axes (indicated by the dot-dash line labelled A) falling in the same line, where projecting portions 7 and socket portions 8 are provided to both ends of respective carbon electrodes in order to secure their engagement. The numeral 3 denotes a torch and the numeral 4 denotes a base (or parental) metal.

According to this invention, it is most desirable that a gouging carbon electrode 2 atop the other 1 is 60 mm in length after gouging. If the length of the top gouging carbon electrode 2 comes to be 40 mm or less, the head of the torch 3 is apt to be damaged by heat, which possibly shortens the life of the torch 3. Moreover, with this shortened carbon electrode 2, gouging cannot be made successfully, which may result in the insufficient result. In order for users to know the existing length of the top carbon electrode 2, it is recommendable to mark it with a notch, ink or material which changes its color at elevated temperatures at 80 mm, 60 mm and 40 mm from the joint 5. In the similar sense, the carbon electrode may contain a material 9 which brings out flame reaction when exposed to flame at 80 mm, 60 mm and 40 mm from the joint 5 so that its existing length can be read readily from the flame reaction. In short, it is desirable for users to know how much the top carbon electrode to be used, no matter what means may be adopted.

TABLE 1

| No. | Diameter of carbon electrode (mm) | Electric current applied (A) | Length of top carbon electrode (mm) |
|---|---|---|---|
| 1 | 8.0 | 350 | 150 |
| 2 | 8.0 | 350 | 80 |
| 3 | 9.5 | 450 | 150 |
| 4 | 9.5 | 450 | 80 |

In Table 1, experimental parameters in the examples of this invention (Nos. 2 and 4) are given together with those in the comparative examples of a conventional gouging process (Nos. 1 and 3). It becomes clear from the experiments summarized in Table 1 that even though the diameter and the applied electric current are made the same, in the comparative examples such a great oxidation takes place in the joint 5 that the top carbon electrode 2 comes off easily from the pieced one 1 before burning off, whereas in the examples of this invention oxidation so scarcely takes place there that the top carbon electrode 2 hardly comes off.

To sum up the above, the following effects can be expected from this invention.

1. The joint 5, comprising projecting and socket portions, does not need coating with any metal; therefore, the production of gouging carbon electrodes does not need any accurate machining or metal coating that requires sophisticated technology, which makes them more available for users, helps to increase their yield and does not reduce their value as a gouging carbon electrode.

2. Carbon-to-carbon contact, realized by this invention, is so effective in lessening frictional resistance in their fitting that the smooth contact also becomes very helpful to widely reduce the loss of products due to breaking of a projecting portion or the brim of a socket portion.

3. An automatic gouging apparatus, which has recently been becoming popular in the industry on account of its lesser degree of environmental polution, can also be provided with such a short carbon electrode of 80 mm or less as claimed in this invention.

As stated above, according to this invention, joinable gouging carbon electrodes can advantageously be manufactured at a very reduced cost without losing any fundamental functions required therefor; thus, they must become indispensable for users in the industry.

I claim:

1. A successively joinable electrode for arc gouging and blasting of metallic articles comprising:
   a consumable elongated electrode body comprising carbon, for striking an arc with a metallic article, having a longitudinal axis and a first end and a second end spaced apart along said longitudinal axis;
   a projection, having an axis, formed at and integral with one of said ends of said electrode body and protruding coaxially therefrom;
   a socket, having an axis, formed at and integral with the other of said ends of said electrode body and extending coaxially inward therefrom;
   indicating means for indicating, during use, that said arc is a predetermined distance from one of said ends;
   said projection of a successive carbon electrode of the same size and shape of said electrode body being sized to be connectably receivable within said socket of said electrode body with carbon-to-carbon contact between said projection of said successive electrode and said socket of said electrode body, whereby a successive electrode may be coaxially joined by insertion of a respective projection into a respective socket.

2. The electrode according to claim 1, wherein said indicating means produces a color change of said electrode.

3. The electrode according to claim 1, wherein said indicating means produces a color change in said arc.

4. The electrode according to claim 1, wherein said indicating means indicates when said arc is about 80 mm from said one of said ends.

5. The electrode according to claim 1, wherein said indicating means indicates when said arc is about 60 mm from said one of said ends.

6. The electrode according to claim 1, wherein said indicating means indicates when said arc is about 40 mm from said one of said ends.

7. The electrode according to claim 1, wherein said indicating means indicates when said arc is successively about 80 mm, about 60 mm and about 40 mm from said one of said ends.

8. A method of using successively joinable electrodes for arc gouging and blasting of metallic articles comprising
   (A) providing at least one new electrode comprising:
      a consumable elongated electrode body comprising carbon, for striking an arc with a metallic article, having a longitudinal axis and a first end and a second end spaced apart along said longitudinal axis,
      a projection, having an axis, formed at end integral with one of said ends of said electrode body and protruding coaxially therefrom,
      a socket, having an axis, formed at and integral with the other of said ends of said electrode body and extending coaxially inward therefrom,
   indicating means for indicating, during use, that said arc is about 80 mm or less from one of said ends,
   said projection of a successive electrode body, comprising carbon, of the same size and shape of said electrode body being sized to be connectably receivable within said socket of said electrode body with carbon-to-carbon contact between said projection and said socket of said electrode body, whereby a successive electrode may be coaxially joined by insertion of a respective projection into a respective socket;
   (B) providing torch means, holdingly receivable of a new electrode proximate said one of said ends associated with said indicating means, for supplying electric power to said new electrode;
   (C) inserting said new electrode into said torch means so that said one of said ends associated with said indicating means is held by said torch means to form a held electrode;
   (D) striking an arc between said held electrode and a metallic surface;
   (E) consuming said held electrode in said arc until said indicating means indicates that said arc is about 80 mm or less from said held end to form a used electrode;
   (F) connecting a new electrode to said held end of said used electrode by insertion of a respective projection into a respective socket;
   (G) repeating steps (C)–(F) until said arc gouging and blasting is complete.

9. The method according to claim 8, wherein said indicating means produces a color change of said electrode.

10. The method according to claim 8, wherein said indicating means produces a color change in said arc.

* * * * *

UNITED STATES PATENT AND TRADEMARK OFFICE
CERTIFICATE OF CORRECTION

PATENT NO.   :   4,918,278
DATED        :   April 17, 1990
INVENTOR(S)  :   NARUO KUWABARA, ET AL.

It is certified that error appears in the above-identified patent and that said Letters Patent is hereby corrected as shown below:

Claim 8, line 10, delete "end", insert --and--.

Signed and Sealed this

Twenty-seventh Day of August, 1991

Attest:

HARRY F. MANBECK, JR.

*Attesting Officer*  *Commissioner of Patents and Trademarks*